6357X
B. Hinckley,
Washing Machine,
Patented Jan. 31, 1831.
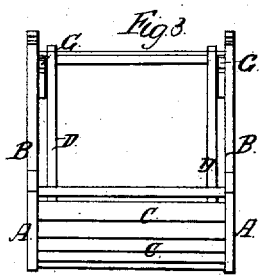
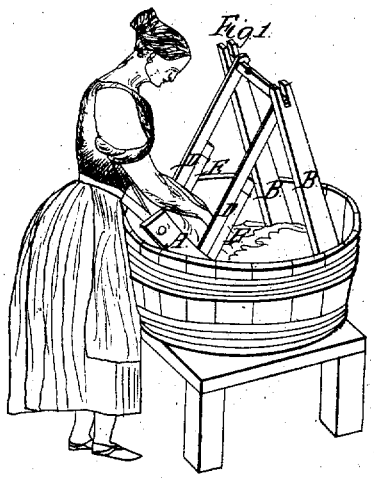
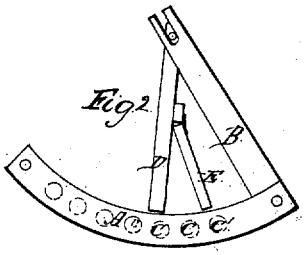
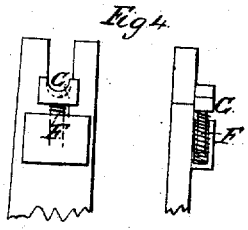
N. PETERS, PHOTO-LITHOGRAPHER, WASHINGTON, D. C.

6357x Benjamin Hinkley.
Letters Patent

The Schedule referred to in these Letters Patent and making part of the same containing
a description in the words of the said Benjamin Hinkley himself of his improvement
in the Washing machine This Machine may be worked in an oblong square box or tub, or in a common cop
er tub of sufficient width and to contained. The construction of this machine commen-
ces with two curved pieces of wood which are twenty seven inches long two and a half
inches wide, and one inch and a half thick. These are placed about eleven inches asunder
with the concaves upward. Small perforations say one fourth of an inch – and a
half deep, are made in the above described curved pieces half an inch below the up-
per edges. These perforations which are ten in number are an inch and one fourth
from each other. commencing at about three inches from one end and extending
towards the other end twelve inches and a half. and this space between the curved
side pieces is occupied by ten rollers which are eleven inches long and one inch thick
the gudgeons of which work in the above mentioned perforations.
The gudgeons may be made of iron, steel: or other kind of hard metal: and of such
size as to work freely in the perforations which receive them. Two rounds of the same size
of the rollers are placed one before the first. and the other beyond the last of the tier
of rollers. leaving a space of one fourth of an inch between the rounds and the roll
ers: The ends of these rounds pass thro' the side pieces in suitable perforations or mor
tises and being secured by suitable pins they connect and firmly fix the side pieces
in their position. Immediately beyond the tier of rollers. and on the outward sides
of the curved side pieces two upright pieces of board are erected. These pieces are thirty three inches high
three and half inches wide at the lower ends. and two and half inches wide at the
upper ends. These are secured in their places by fastening the lower ends in the side pie-
ces by a dovetail. The upright pieces do not stand perfectly erect but incline towards
the rollers so that a line dropped from the tops will fall directly in the depth or
centre of the curve. In the upper ends of the upright pieces are perforations, or
mortises extending from the upper ends downwards six inches. The tops of these mor-
tises or sockets are open and the bottoms are semicircular and serve as a rest for the
Rubber. The Rubber is an oblong square frame work twenty seven inches long and Drawing 6357x Jan 31, 1831 about eleven inches wide. This consists of two side pieces which are two inches wide
and three fourths of an inch thick. connected at top and bottom by cross pieces that
are one inch and a half square. and the ends of the upper cross piece which extend out-
wards two inches and a half from the side pieces are fitted to work in the above
described sockets in the manner of gudgeons. The construction of the rubber is com-
pleted by the addition of another piece of frame work. the side pieces of which are only six-
teen inches long. and of the same width and thickness of the others. and the lower ends
are connected by a cross piece of the same construction of that which connects the lower
ends of the other side pieces. These two pieces are connected into one by placing them together
so that the two bottom pieces shall exactly correspond with each other. and they are secu-
red in this position by screwing or nailing the upper ends of the latter side pieces
firmly to the others. This piece of the machine is fitted to operate as a set of hand
to grasp and hold the linen or other clothes designed to be washed. by cutting off the
side pieces of the last described part of the rubber at about three inches from the upper
ends and attaching suitable hinges at the same places so as to form joints. The two
bottom pieces are made to be open by means of light steel springs which are placed
between the side pieces of the two parts of the rubber. By dropping the gudgeons of the
upper end piece of the rubber into the sockets of the upper ends of the upright pieces
the rubber has its proper place in the machine. To facilitate the operation of the
rubber it is raised from the rollers by two spiral springs which are secured in their
proper places by blocks that are three inches long, two inches wide, and one inch
and a fourth thick. These blocks are perforated thro from top to bottom with a half
inch auger or bit. and one block secured on the outside of each of the upright pieces
about three inches below the lower part of the sockets. and pins are fitted to work in
the perforations made in the blocks. These pins are about twelve inches long. the
heads of the pins are three inches long two inches wide and one inch thick. On
the top of the [illegible] is a curve fitted to receive the gudgeons which extend outward
from the upright pieces sufficiently to rest on the curved ends of the pins. The
aforementioned spiral springs enclose the lower part of the pins and occupy
a space of six inches between the upper ends of the perforated blocks. and the square
shoulders at the lower part of the head of the pins. A piece of lining is inserted un-
der the aforementioned tier of rollers. commencing at the end of the side pieces where
the rollers commence, and extends about nine inches. The lining must be one inch below the rollers that they may not be exclarded in their motion. To operate this machine it is placed in the tub in an inclined position. one end of the curved side pieces resting on the bottom of the tub and the other end on the side of the tub. The Clothes are prepared as they usually are for washing by hand or on a common wash board. and being thus prepared they are deposited in the tub together with the warm suds. The person performing the labour places one or more pieces of linen or other clothes within the grasp of the rubber. and placing the hands upon the lower cross piece of the rubber. by a dexterous motion the process of cleansing the clothes is effected with ease and despatch. Altho rollers and rubbers of various descriptions have been entered into machines constructed for the purpose of cleansing or washing clothes. yet I alledge that the foregoing describes a new arrangement and construction of the parts constituting a new conformation and producing the effect by a mode of operation entirely new. and therefore claim it as my own invention. The size of the machine may be varied so as to be adapted to any tub Exa
[illegible]

Witnesses
George Smith
Robt Haskell

Benjn. Hinkley.

1264